United States Patent
Murakami

(10) Patent No.: US 8,830,405 B2
(45) Date of Patent: Sep. 9, 2014

(54) DC/DC CONVERTER AND TELEVISION USING SAME

(75) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 230 days.

(21) Appl. No.: 13/413,833

(22) Filed: Mar. 7, 2012

(65) Prior Publication Data

US 2012/0229707 A1 Sep. 13, 2012

(30) Foreign Application Priority Data

Mar. 7, 2011 (JP) .................................. 2011-048503
Feb. 3, 2012 (JP) .................................. 2012-021852

(51) Int. Cl.
*H04N 5/63* (2006.01)

(52) U.S. Cl.
USPC ........... 348/730; 348/731; 348/732; 348/733; 348/736; 348/725; 348/705; 348/706; 348/571; 348/572; 348/569; 348/570; 348/308; 348/307; 348/14.11; 323/222; 323/282; 323/268; 323/271; 323/284; 315/226; 315/224; 315/291; 725/59; 725/94; 725/106; 725/133; 725/141; 219/666

(58) Field of Classification Search
USPC ......... 348/730, 731, 736, 733, 729, 725, 705, 348/706, 308, 305, 14.11; 323/222, 282, 323/268, 271, 284; 315/291, 224, 226; 219/666; 725/59, 106, 133, 141
See application file for complete search history.

(56) References Cited

U.S. PATENT DOCUMENTS

| | | | | |
|---|---|---|---|---|
| 5,982,160 A | * | 11/1999 | Walters et al. | 323/282 |
| 6,642,696 B2 | * | 11/2003 | Tateishi | 323/222 |
| 7,031,174 B2 | * | 4/2006 | Lipcsei | 363/98 |
| 7,196,499 B1 | * | 3/2007 | Lipcsei | 323/222 |
| 7,443,148 B2 | | 10/2008 | Weng | |
| 7,482,791 B2 | | 1/2009 | Stoichita et al. | |
| 7,482,793 B2 | | 1/2009 | Stoichita | |
| 7,548,048 B2 | * | 6/2009 | Chang | 323/283 |
| 7,616,454 B2 | * | 11/2009 | Yang | 363/15 |
| 7,626,370 B1 | * | 12/2009 | Mei et al. | 323/282 |
| 7,714,547 B2 | | 5/2010 | Fogg et al. | |
| 8,008,899 B2 | * | 8/2011 | Heim et al. | 323/222 |

(Continued)

FOREIGN PATENT DOCUMENTS

| | | |
|---|---|---|
| JP | 2008-029159 | 2/2008 |
| JP | 2009-148155 | 7/2009 |
| JP | 2009-148157 | 7/2009 |
| JP | 2010-226930 | 10/2010 |

*Primary Examiner* — Jefferey Harold
*Assistant Examiner* — Mustafizur Rahman
(74) *Attorney, Agent, or Firm* — Fish & Richardson P.C.

(57) ABSTRACT

A DC/DC converter 10 has a high-side transistor QH as a switching element and a low-side transistor QL as a synchronous rectifier element. A first primary electrode D and secondary primary electrode S of the high-side transistor QH are connected to an input voltage VIN and an external terminal T1, respectively. A detection transistor QD is provided in a row with the high-side transistor QH, and the ON voltage of the high-side transistor QH when ON is output as detection voltage VQD from the detection transistor QD. The output detection voltage VQD is added to a feedback voltage VFB1 by an adder CB, and inputted to a comparator CMP1. The ON period of a one-shot pulse PS1 outputted from the comparator CMP1 is regulated so as to be in direct proportion to the sum of the detection voltage VQD and the feedback voltage VFB1.

16 Claims, 9 Drawing Sheets

(56) References Cited

U.S. PATENT DOCUMENTS

| | | | |
|---|---|---|---|
| 8,102,679 B2* | 1/2012 | Gong et al. | 363/21.12 |
| 8,289,732 B2* | 10/2012 | Li et al. | 363/21.12 |
| 2003/0007376 A1* | 1/2003 | Brkovic | 363/98 |
| 2007/0069699 A1* | 3/2007 | Lipcsei | 323/222 |
| 2008/0054869 A1* | 3/2008 | Chang | 323/283 |
| 2009/0009104 A1* | 1/2009 | Doi et al. | 315/291 |
| 2009/0015726 A1* | 1/2009 | Jitsuhara | 348/734 |
| 2011/0316502 A1* | 12/2011 | Tang et al. | 323/271 |

* cited by examiner

DC/DC CONVERTER AND TELEVISION USING SAME

CROSS-REFERENCE TO RELATED APPLICATIONS

This application is based upon and claims the benefit of priority from the corresponding following Japanese Patent Applications, the entire contents of which are incorporated herein by reference.
(1) Japanese Patent Application No. 2011-048503 (filed Mar. 7, 2011)
(2) Japanese Patent Application No. 2012-021852 (filed Feb. 3, 2012)

BACKGROUND OF THE INVENTION

1. Field of the Invention

The present invention relates to a DC/DC converter, and in particular to a DC/DC converter using fixed ON time control.

2. Description of Related Art

DC/DC converters are widely adopted for use in power sources for liquid crystal televisions, digital versatile disc (DVD) players, Blu-ray Disc players, plasma display panels (PDPs), and the like.

Patent document 1 (Unexamined Japanese Patent Application Publication No. 2008-29159) provides a DC/DC converter performing fixed ON time pulse frequency modulation (PFM) control, that has a simple control circuit configuration, lowers switching frequency under light loads to reduce power consumption, and operates at an approximately constant switching frequency under heavy loads regardless of variations in input/output voltage. For this purpose, the converter is provided with a control circuit that performs pulse frequency modulation control such that the switching element has a fixed ON time and a variable OFF time. The control circuit links the ON time of the switching element to variations in at least one of an input voltage and an output voltage. Specifically, the ON time of the switching element, i.e., a switching transistor supplying energy to an inductor, is reduced as input voltage increases, or increased as output voltage increases.

The control circuit described in Patent document 1 has an error amplifier for amplifying the error between the output voltage and a target voltage, an oscillator whose frequency increases or decreases based on an error signal output by the error amplifier, and a one-shot circuit that is triggered by a frequency signal output by the oscillator, generating a specific ON time. The one-shot circuit includes a capacitor, a current supply circuit that supplies charging current to the capacitor, and a voltage detecting circuit that detects whether the voltage of the capacitor has surpassed a preset voltage.

Patent document 2 (Unexamined Japanese Patent Application Publication No. 2009-148155) proposes an internal ripple generating, fixed ON time voltage regulator with increased output voltage accuracy for a DC/DC converter using fixed ON time control.

According to paragraph 3 of Patent document 2, an output capacitor with an arbitrary equivalent series resistance (ESR) value is provided for the purpose of improving output voltage accuracy. According to paragraph 0009, the voltage regulator using fixed ON time, i.e., constant ON time, control is a type of voltage regulator that uses ripple mode control. According to paragraph 0011, it is possible to minimize noise and reduce variation in load voltage by reducing the ripple, but this impedes ripple mode voltage regulation. Reducing ripple size also decreases the comparison voltage differential, greatly impeding swift and accurate comparison. U.S. Pat. Nos. 7,482,791 and 7,482,793 may be referred to as patents of the same family as patent document 2.

U.S. Pat. Nos. 7,443,148, 7,482,791, and 7482793 may be referred to as patents of the same family as patent document 3 (Unexamined Japanese Patent Application Publication No. 2009-148157). Patent document 3 relates to patent document 2, and proposes a constant ON time voltage regulator with an increased maximum duty cycle. Provided within is a DC/DC converter with a fixed (constant) ON time, minimum OFF time control loop. Patent document 3 includes a fixed ON time control circuit that receives an input voltage, provides a switching output voltage on a switch output node using a minimum ON time, variable OFF time feedback control loop, and generates a first signal for turning off a high-side switch at the expiration of a first ON time duration or at the expiration of a maximum ON time. The first ON time duration is at least a minimum ON time and is allowed to expand to a maximum ON time when the feedback voltage remains less than a reference voltage.

Patent document 4 (U.S. Pat. No. 7,714,547) discloses a fixed ON time switch mode DC/DC converter. In FIG. 1 therein, a fixed ON time DC/DC converter 10, a regulation circuit 12, a combining circuit 16, and a slope signal generator 18 are provided. The regulation circuit 12 is provided with a comparator 14, a one-shot timing circuit 30, and an S-R flip flop 32.

Patent document 5 (Unexamined Japanese Patent Application Publication No. 2010-226930) provides a DC/DC converter enabling stabilization of switching frequency. According to paragraph 0003 thereof, a fixed ON time DC/DC converter using a comparator compares an output voltage to a reference voltage, and controls (for instance, turns ON) a switch (transistor) for a constant period using a signal generated in accordance with the results of the comparison. Thus, output voltage is regulated by regulating the OFF period of the switch.

According to paragraph 0005 of patent document 5, when the input voltage, output voltage, or output current of the DC/DC converter using a comparator varies, the switching duty ratio of the switch varies. This causes switching frequency (switching period) to vary. Such variation in switching frequency forebodes difficulties in preventing noise generated by switching. This is because, when frequency is constant, it is possible to take noise prevention steps suitable for that frequency. Patent document 5 also points out that when a plurality of DC/DC converters are operated, a problem arises in that electromagnetic interference (EMI) noise is generated by the mutual interference among the plurality of switching frequencies arising from the differences in switching frequency between the DC/DC converters.

FIG. 3 illustrates a synchronous rectifier buck DC/DC converter using fixed ON time control subjected to an experiment conducted during the process of arriving at the present invention. Much of the circuitry of a DC/DC converter 30 is contained within an integrated circuit IC3. The integrated circuit IC3 has a high-side transistor QH and a low-side transistor QL. The low-side transistor QL functions as a synchronous rectifier transistor. A first primary electrode D of the high-side transistor QH is connected to an input voltage VIN, and a second primary electrode S thereof is connected to a first primary electrode D of the low-side transistor QL.

The high-side transistor QH and the low-side transistor QL may both be configured as, for example, n-channel MOS transistors, but are not limited thereto. For instance, a combination of an n-channel and a p-channel MOS transistor is also acceptable. Rather than a MOS transistor, a bipolar transistor configuration is also acceptable.

A second primary electrode S of the low-side transistor QL is connected to a ground potential GND.

Drive signals SDH and SDL are input to control electrodes G of the high-side transistor QH and the low-side transistor QL, respectively. The drive signals SDH and SDL are synchronous with each other, and the polarities thereof are set so that the ON/OFF states of the high-side transistor QH and the low-side transistor QL are the inverse of each other.

This document uses the terms "first primary electrode", "second primary electrode", and "control electrode" to refer to the various transistor electrodes. In the case of a MOS transistor, a first primary electrode may at times be a drain electrode or a source electrode. Because a second primary electrode may likewise be at times a source electrode or a drain electrode, it is impossible to define the electrodes as one specific type. However, a control electrode may be defined as a gate electrode. The same applies in the case of a bipolar transistor. What is referred to as a first primary electrode may be at times a collector electrode or an emitter electrode, and what is referred to as a second primary electrode may be at times an emitter electrode or a collector electrode, making it impossible to define the electrode as either type. However, a control electrode may be defined as a base electrode.

The second primary electrode S of the high-side transistor QH and the first primary electrode D of the low-side transistor QL have a common connection, and the common connection point thereof is connected to an external terminal T1. The external terminal T1 is one of the external terminals provided on the integrated circuit IC3, and in particular the external terminal T1 is equivalent to the output terminal of the DC/DC converter 30. The integrated circuit IC3 has numerous terminals apart from the external terminal T1, but these have been omitted from the drawing for simplicity of description.

An inductor L1 and an output capacitor C1 are connected in series between the external terminal (output terminal) T1 and the ground potential GND. An output voltage VOUT is output from the common connection point of the inductor L1 and the output capacitor C1.

The input voltage VIN supplied to the first primary electrode D of the high-side transistor QH is stepped down to a lower voltage, and the output voltage VOUT is output from the second primary electrode S of the high-side transistor QH. The magnitudes of the input voltage VIN and the output voltage VOUT are, for example, 12V and 5V direct current voltages, respectively.

FIG. 3 depicts a synchronous rectifier buck DC/DC converter that also constitutes a fixed ON time control DC/DC converter. The fixed ON time control DC/DC converter 30 has a one-shot circuit 30A.

The one-shot circuit 30A outputs a one-shot pulse PS1 to an output terminal of a comparator CMP1. The one-shot pulse PS1 is inputted to, for example, an S-R flip flop not shown in the drawings.

The one-shot circuit 30A has a current mirror circuit CM1. The current mirror circuit CM1 has at least one pair of transistors with an MOS or bipolar configuration. A constant current I1 is output from one terminal of the current mirror circuit CM1, and the constant current I1 travels from a first primary electrode D of a transistor Q1 to a second primary electrode S.

An inverting input terminal (−) of an operational amplifier OP1 and the second primary electrode S of the transistor Q1 have a common connection, and a resistor R1 is connected to the common connection point thereof. For this reason, the constant current I1 is determined by the voltage of the inverting input terminal (−) of the operational amplifier OP1 and by the resistor R1. Due to the circuit operation of the operational amplifier OP1, the voltage of the inverting input terminal (−) of the operational amplifier OP1 is equal to a reference voltage VB1 input to a non-inverting input terminal (+) of the operational amplifier OP1. The reference voltage VB1 is determined by the magnitudes of an input voltage VIN and resistors R2 and R3. The constant current I1 is accordingly expressed by numerical formula 1, where r1 is the resistance value of the resistor R1.

(Numerical Formula 1)

$$I1 = \frac{VB1}{r1} \quad (1)$$

The constant current I1 generated by the operational amplifier OP1, transistor Q1, resistors R1 through R3, and input voltage VIN is output from the other terminal of the current mirror circuit CM1, and charges a capacitor C2. The current charging the capacitor C2 can be easily adjusted to be greater or smaller than the constant current I1 depending on the configuration of the current mirror circuit CM1, but, for simplicity of description, is the same within an embodiment of the present invention.

When the capacitor C2 is charged by the constant current I1, and a transistor Q2 is switched ON and OFF at a specified interval, a ramp wave signal ST with superior linearity is generated at one terminal of the capacitor C2, i.e., the non-inverting input terminal (+) of the comparator CMP1. A one-shot pulse PS1 is generated by this ramp wave signal ST.

The amplitude STP of the ramp wave signal ST is determined by a reference voltage VFB3 of the inverting input terminal (−) of the comparator CMP1. The reference voltage VFB3 is determined by an output voltage VOUT and resistors R4 and R5. For instance, when the output voltage VOUT is 5V and the resistance values of the resistors R4 and R5 are 40 KΩ and 10 KΩ, respectively, the reference voltage VFB3 is 1V. Thus, when the ramp wave signal ST reaches 1V, the output of the comparator CMP1 transitions from a low level to a high level, and a one-shot pulse PS1 having an ON period $T_{ON1}$ is output.

The ON period $T_{ON1}$ of the one-shot pulse PS1 is expressed by numerical formula 2, where VIN is inputted voltage, VOUT is output voltage, r1 is the resistance value of the constant current I1 and the resistor R1, and c2 is the capacity of the capacitor C2.

(Numerical Formula 2)

$$T_{ON1} = \frac{c2 \cdot VFB3}{I1} = \frac{VFB3 \cdot r1 \cdot c2}{VIN} \quad (2)$$

As is clear from numerical formula 2, the ON period $T_{ON1}$ of the one-shot pulse PS1 output from the one-shot circuit 30A is inversely proportional to the input voltage VIN, and directly proportional to the reference voltage VFB3, i.e., the output voltage VOUT.

Stated otherwise, numerical formula 2 illustrates that when a fixed ON time control DC/DC converter is configured using the one-shot circuit 30A, the ON period $T_{ON1}$ of the switching element is dependent upon the respective magnitudes of the input voltage VIN and the output voltage VOUT.

The inventors discovered that, in a fixed ON time control DC/DC converter using the one-shot circuit 30A, when the load current IL, i.e., the current traveling from the high-side transistor QH toward the inductor L1, increases, the ON resistance of the high-side transistor QH ceases to be negligible, and the ON duty ratio $D_{ON}$ of a switching signal SW varies. Specifically, even when the voltage drop in the high-side transistor QH is no longer negligible due to the ON resistance of the high-side transistor QH, because the output voltage VOUT is controlled so as to reach a specific magnitude of, for example, 5V by the circuit configuration of the DC/DC converter, the ON duty ratio $D_{ON}$ increases. Stated otherwise, the OFF period $T_{OFF}$ grows shorter, the period decreases, and the operating frequency of the DC/DC converter 30 increases.

When the operating frequency of the DC/DC converter 30 increases, the output voltage VOUT varies due to EMI noise prevention being impeded and the operating point of the ripple generating circuit in the DC/DC converter using a ripple generating circuit varying. The ripple generating circuit will be described below.

FIG. 4 is a schematic illustration of variations arising in the switching signal SW output to the external terminal T1 of FIG. 3. A switching signal SW1 illustrates an instance where the load current IL flowing through the DC/DC converter 30 is comparatively low, i.e., the load is comparatively light; and a switching signal SW2 illustrates an instance where the load current IL is comparatively great, i.e., the load is comparatively heavy.

When the load current IL is comparatively small or the ON resistance $R_{ONH}$ of the high-side transistor QH is comparatively low, i.e., when the load is comparatively light, the voltage drop caused by the ON resistance $R_{ONH}$ of the high-side transistor QH is negligible, meaning that the amplitude $V_{PSW1}$ of the switching signal SW1 is roughly equivalent to the input voltage VIN. Here, the switching signal SW1 is illustrated by an ON period $T_{ON1}$, an OFF period $T_{OFF1}$, and a period T1. The period T1 is expressed as $T1=T_{ON1}+T_{OFF1}$, and the ON duty ratio $D_{ON1}$ of the switching signal SW1 is expressed by $D_{ON1}=T_{ON1}/(T_{ON1}+T_{OFF1})$.

When the load current IL is comparatively great or the ON resistance $R_{ONH}$ of the high-side transistor QH is comparatively great, i.e., when the load is comparatively heavy, the voltage drop caused by the ON resistance $R_{ONH}$ of the high-side transistor QH ceases to be negligible, meaning that the amplitude $V_{PSW2}$ of the switching signal SW2 does not reach the input voltage VIN, but drops by the amount of a voltage drop $V_{drop}$. The voltage drop $V_{drop}$ is expressed as the product of the ON resistance $R_{ONH}$ of the high-side transistor QH and the load current IL; i.e., $V_{drop}=R_{ONH} \times IL$. The switching signal SW2 is illustrated with an ON period $T_{ON2}$, an OFF period TOFF2, and a period T2. The period T2 is expressed as $T2=T_{ON2}\pm T_{OFF2}$, and the ON duty ratio $D_{ON2}$ of the switching signal SW2 is expressed as $D_{ON2}=T_{ON2}/(T_{ON2}+T_{OFF2})$.

Even when the amplitude $V_{PSW2}$ of the switching signal SW2 decreases, because the output voltage VOUT is set to a specific amplitude of, for instance, 5V due to the circuit configuration of the DC/DC converter, the OFF period $T_{OFF2}$ of the high-side transistor QH grows shorter, and the ON duty ratio $D_{ON2}$ grows larger than the ON duty ratio $D_{ON1}$ of the switching signal SW1. That is, the relationship T2<T1 holds between the period T2 of the switching signal SW2 and the period T1 of the switching signal SW1, and the frequency of the switching signal SW2 is greater than that of the switching signal SW1.

Variation in the frequency of the switching signal SW2 hampers prevention of noise caused by the switching of the high-side transistor QH. This is because, while it is possible to provide a band-pass filter that dampens the frequency components when the frequency is constant, such a measure is not possible when the operating frequency of the DC/DC converter 30 varies at random.

FIG. 5 depicts another DC/DC converter 50 provided so as to prevent noise. The DC/DC converter 50, like that of FIG. 3, is a synchronous rectifier buck DC/DC converter using fixed ON time control. The DC/DC converter 50 is characterized in particular in being provided with a ripple generating circuit RI. The DC/DC converter using fixed ON time (constant ON time) control is a ripple mode control type, as suggested by patent document 3.

The DC/DC converter 50 has an integrated circuit IC5. The integrated circuit 105 has at least external terminals T1, T2, T3, and T4. The external terminal T1 is equivalent to the output terminal of the DC/DC converter 50, with an inductor L1 and a output capacitor C1 connected in series between the external terminal T1 from which a switching signal SW is output and a ground potential GND, and an output voltage VOUT is output from the common connection point of the inductor L1 and the output capacitor C1.

The external terminal T1 is disposed at the common connection point of a high-side transistor QH and a low-side transistor QL. The high-side transistor QH is disposed toward an input voltage VIN, and the low-side transistor QL is disposed by a ground potential GND. The high-side transistor QH, low-side transistor QL, inductor L1, output capacitor C1, input voltage VIN, and output voltage VOUT are the same as those illustrated in FIG. 3.

The external terminal T2 is provided so as to lead the inverting input terminal (−) of a comparator CMP2 out of the integrated circuit IC5. A feedback voltage VFB5 consisting of an output voltage VOUT divided by resistors R11 and R12 is returned to the external terminal T2.

The external terminal T3 is provided in order to connect a capacitor C6 that generates a soft start voltage VSS. Such soft start voltage VSS is often used in a DC/DC converter of this kind, and the purpose thereof is to smooth the startup operation of the DC/DC converter 50. A constant current source CC1 and a bandgap voltage circuit BG are connected to the external terminal T3.

The bandgap voltage circuit BG generates a bandgap voltage of, for instance, 1.2V that is not dependent upon the magnitude of a power source voltage VC1 or changes in ambient temperature.

The reference voltage generated by the bandgap voltage circuit BG is used to define the upper limit value of the soft start voltage VSS, or to set the average voltage of the soft start voltage VSS.

In the ripple generating circuit RI, a ripple is superimposed upon the soft start voltage VSS. Properly described, the ripple generating circuit RI functions as a circuit for generating a pseudo-ripple component. The provision of the ripple generating circuit RI can increase the coverage of the output capacitor C1.

Normally, a ripple control DC/DC converter requires an amplitude of a certain size in order to accurately detect output ripple voltage. For this reason, an output capacitor C1 with a comparatively great ESR must be provided. However, it is not preferable for ESR and ripple voltage amplitude to be increased, as this reduces noise resistance properties as well as load voltage properties.

When a ripple generating circuit RI is provided, it can be made to conform to an output capacitor C1 having a desired ESR value. For instance, when the ESR of the output capacitor C1 is high, either no ripple voltage is generated in the ripple generating circuit RI, or the amplitude thereof can be kept low. When the ESR of the output capacitor C1 is low, the amplitude of the ripple voltage generated in the ripple generating circuit RI can be adjusted so as to be high. A specific example of the ripple generating circuit RI will be described below.

A soft start voltage VSS upon which a ripple voltage VRI is imposed is inputted as a reference voltage VREF5 to a non-inverting input terminal (+) of a comparator CM2. An inverting input terminal (−) of the comparator CM2 is connected to the external terminal T2. A feedback voltage VFB5 consisting of an output voltage VOUT divided by resistors R11 and R12 is returned to the external terminal T2.

The comparator CMP2 compares the reference voltage VREF5 upon which the ripple voltage is imposed with the feedback voltage VFB5, and outputs a comparison signal $V_{CMP2}$. When the feedback voltage VFB5 is greater than the reference voltage VREF5, the comparison signal $V_{CMP2}$ is of a low level; and, contrariwise, when the feedback voltage VFB5 is less than the reference voltage VREF5, the comparison signal $V_{CMP2}$ is of a high level.

The comparison signal $V_{CMP2}$ is inputted to a one-shot circuit OS1 as well as to a set terminal S of an S-R flip flop FF.

The one-shot circuit OS1 outputs a one-shot pulse PS1 using the rising or falling edge of the comparison signal $V_{CMP2}$. An output voltage VOUT is input to the one-shot circuit OS1 via the external terminal T4. In this way, the one-shot circuit OS1 is retained at a specific circuit operating point by the output voltage VOUT.

The one-shot pulse PS1 output by the one-shot circuit OS1 is inputted to a reset terminal R of the S-R flip flop.

The S-R flip flop FF is set by the comparison signal $V_{CMP2}$, and outputs an output signal, reset by the one-shot pulse PS1, that is inputted to a driver DRV.

The driver DRV generates drive signals DRVH and DRVL for driving the high-side transistor QH and the low-side transistor QL, respectively. When the high-side transistor QH is in an ON state, the driver DRV generates a drive signal so that the low-side transistor QL switches to an OFF state. The drive signals DRVH and DRVL are not necessarily set at inverse polarities; when the high-side transistor QH and the low-side transistor QL are of different conducting types, drive signals of the same polarity are input synchronously.

The high-side transistor QH is connected to an input voltage VIN, and supplies energy to the inductor L1 connected to the external terminal T1. The low-side transistor QL is provided in order to synchronously rectify the energy accumulated within the inductor L1.

The inventors also discovered that, because an external terminal T2 for inputting the feedback voltage VFB5 to the comparator CMP2 must be provided in the integrated circuit IC5, the number of external terminals on the ripple control DC/DC converter 50 of FIG. 5 increases, and, because these terminals lead outside the integrated circuit IC5, noise resistance properties are reduced.

FIG. 6 illustrates a ripple generating circuit used in the ripple control DC/DC converter of FIG. 5. A ripple generating circuit RI is generated using the switching signal SW output from the external terminal T1. The ripple generating circuit RI is constituted by an operational amplifier OP2, resistors R9 and R10, and a capacitor C3. A reference voltage VR1 is inputted to the non-inverting input terminal (+) of the operational amplifier OP2. A common connection point of the resistor R9 and the resistor R10, and an end of the capacitor C3, are connected to the inverting input terminal (−) of the operational amplifier OP2. The resistor R10 and the capacitor C3 are connected in a row, and constitute a so-called integrating circuit. The switching signal SW is integrated by this integrating circuit and further amplified, and a ramp wave-shaped pseudo-ripple voltage DVR1 is generated at the output of the operational amplifier OP2.

SUMMARY OF THE INVENTION

The technical field of the DC/DC converter according to the present invention is roughly in common with that of the fixed ON time control DC/DC converters disclosed in patent documents 1 through 5. The DC/DC converter according to the present invention provides a DC/DC converter enabling the problems with noise resistance properties discussed with reference to FIGS. 3 and 5 to be improved.

The DC/DC converter according to the present invention has an input voltage; an output terminal for converting the input voltage and outputting an output voltage; an inductor connected to the output terminal; a switching element having a first primary electrode connected to the input voltage and a second primary electrode connected to the output terminal in order for energy to be supplied to the inductor; an output capacitor for smoothing the energy accumulated within the inductor, and for outputting the output voltage; a feedback voltage generating circuit for feeding back to the switching element the output voltage generated in the output capacitor; and an adder for adding the on voltage of the switching element when on and the feedback voltage generated in the feedback voltage generating circuit.

Another DC/DC converter according to the present invention is a DC/DC converter having an input voltage; an output terminal for converting the input voltage and outputting an output voltage; a switching element for performing repeated switching between ON and OFF states, the switching element connected between the input voltage and the output terminal and having a first primary electrode, a second primary electrode, and a control electrode; an inductor connected to one of either the first primary electrode or the second primary electrode of the switching element; an output capacitor for smoothing the energy accumulated within the inductor; a feedback voltage generating circuit made of a first feedback resistor and a second feedback resistor for feeding back the output voltage to the switching element; and an integrated circuit for driving the switching element; wherein the first feedback resistor and the second feedback resistor are built into the integrated circuit.

The present invention is configured so as to increase the ON duty ratio as the ON voltage generated by the ON resistance of the high-side transistor, i.e., the switching element, increases, enabling defects such as shifts in the operating point of the DC/DC converter or variations in operating frequency to be eliminated, and reduction of noise resistance properties to be prevented. Another invention of the present invention is configured so that a feedback resistor for determining an output voltage is built into an integrated circuit, enabling defects such as a reduction in noise resistance properties caused by external noise to be minimized.

Further features, elements, steps, advantages, and characteristics of the present invention will become apparent from the detailed description of the best mode for embodying the invention and the attached drawings relating thereto given below.

BRIEF DESCRIPTION OF THE DRAWINGS

Brief Description of the Drawings

Figure 1:
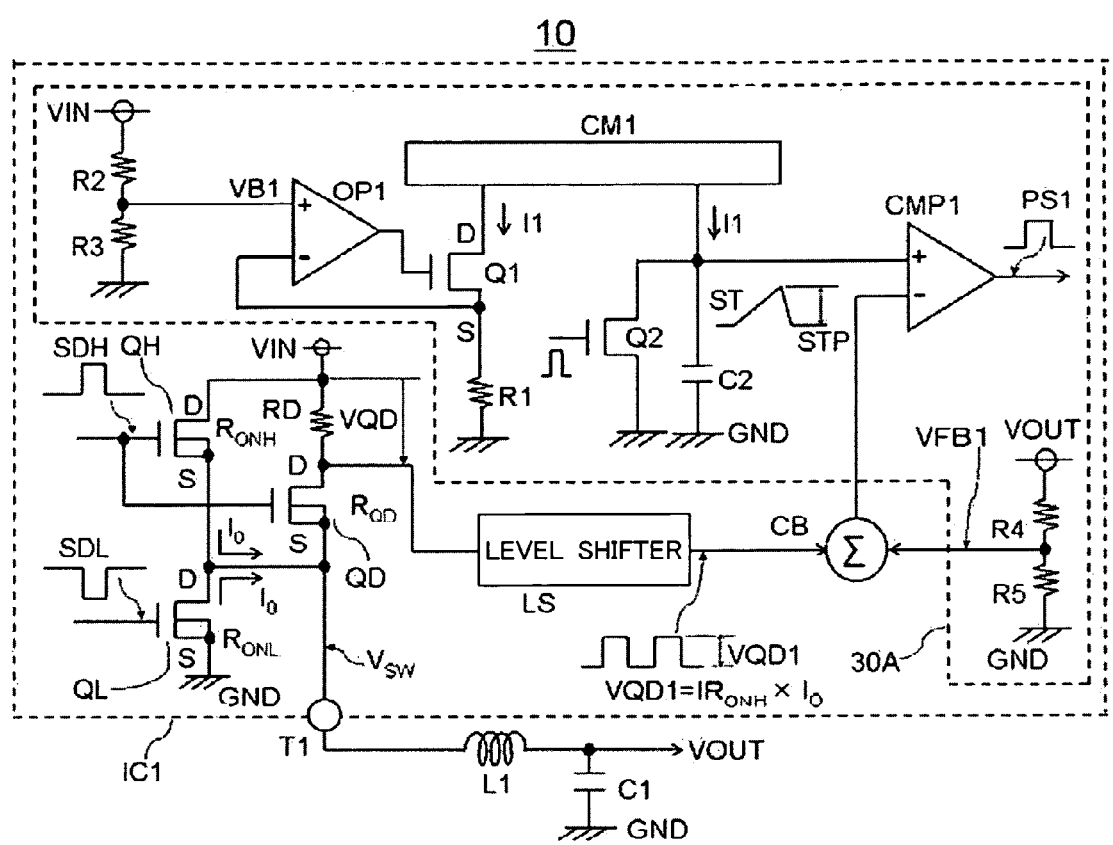
Figure 2:
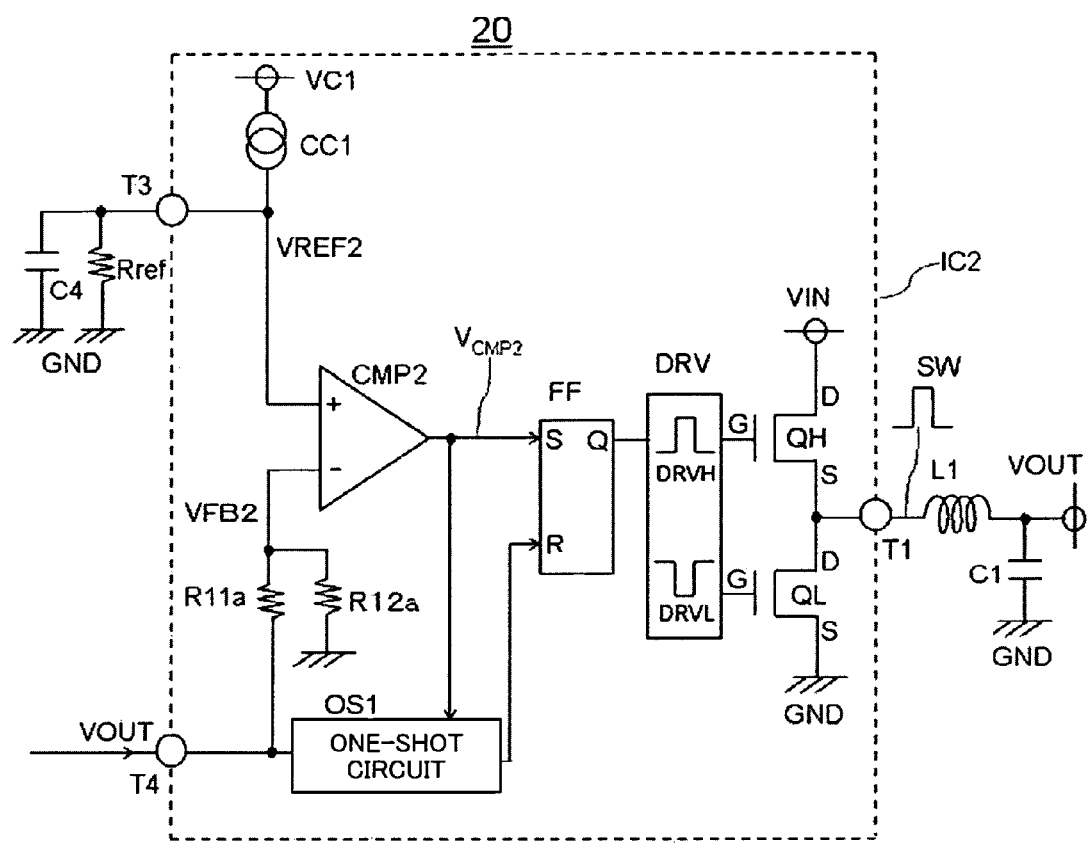
Figure 3:
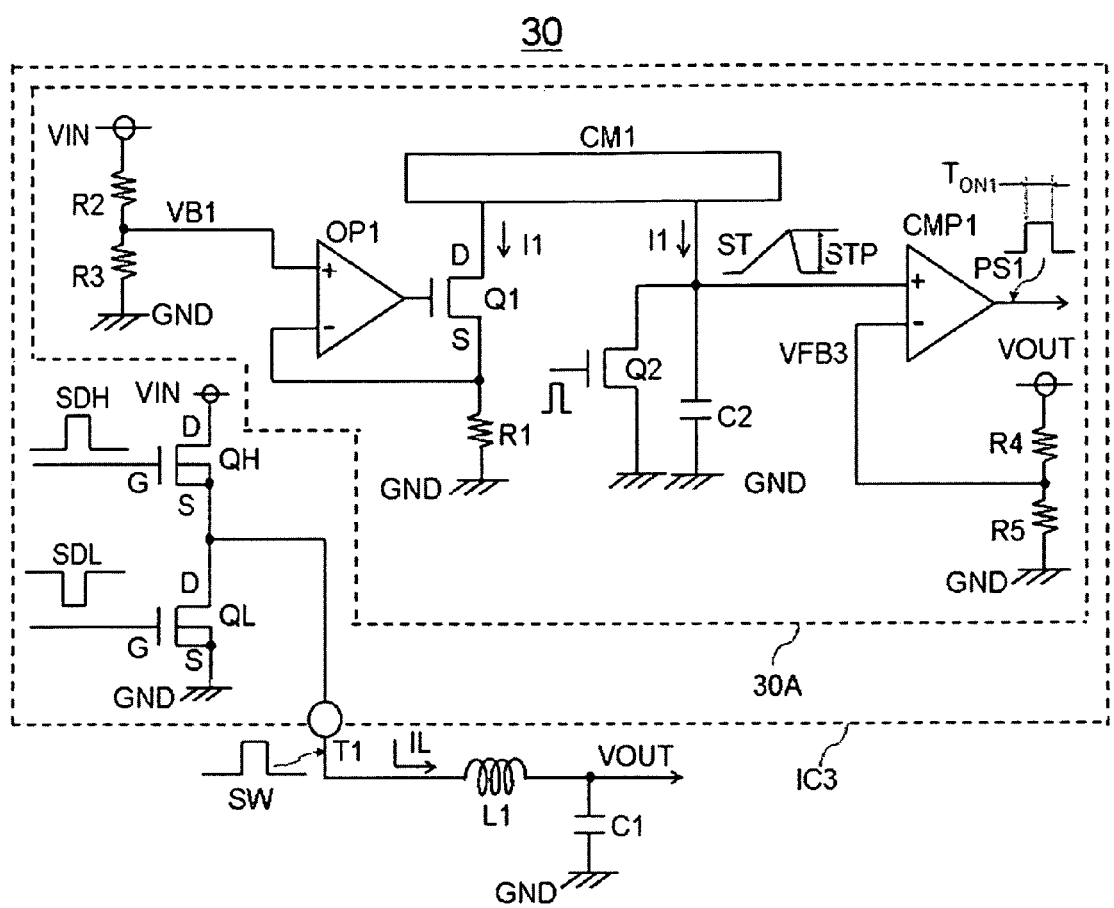
Figure 4:
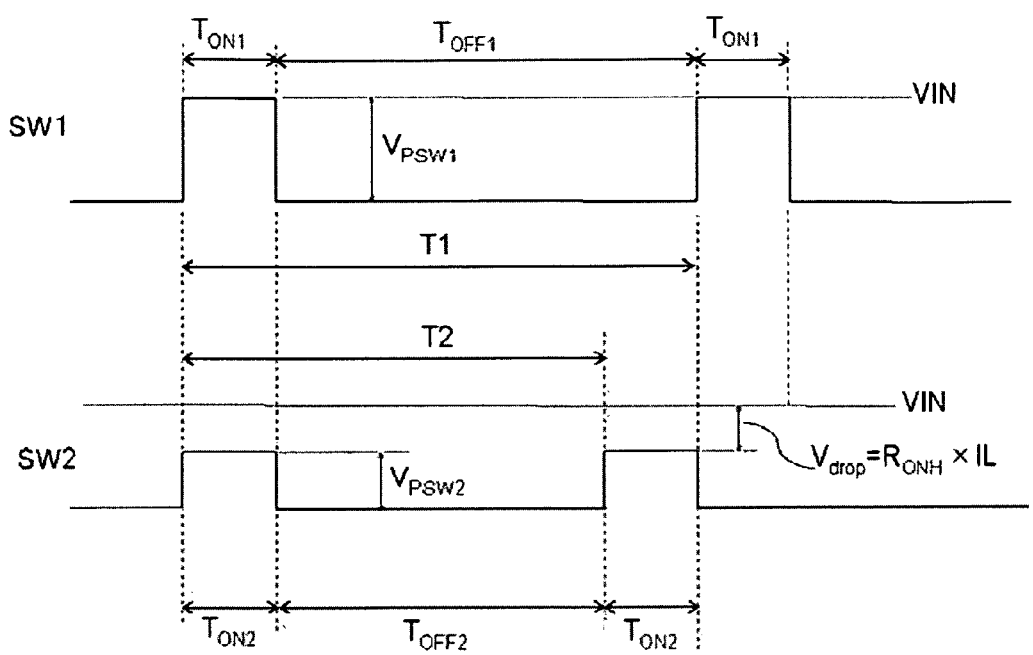
Figure 5:
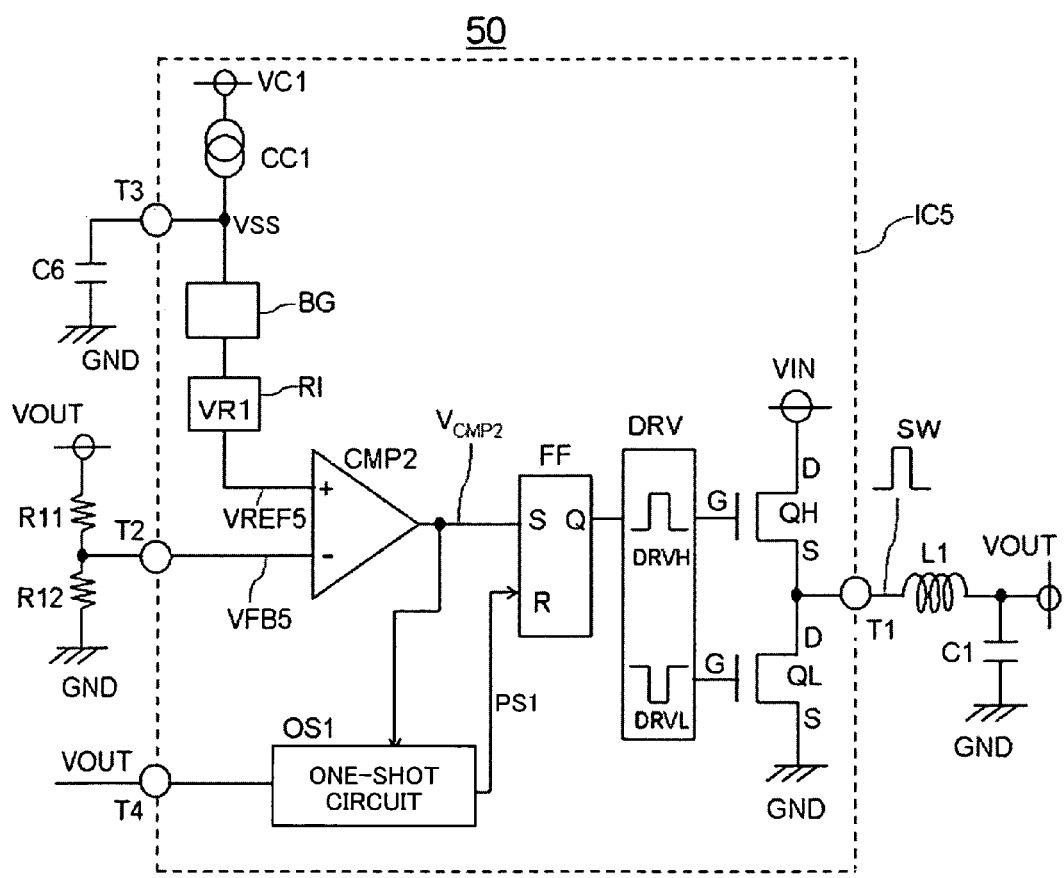
Figure 6:
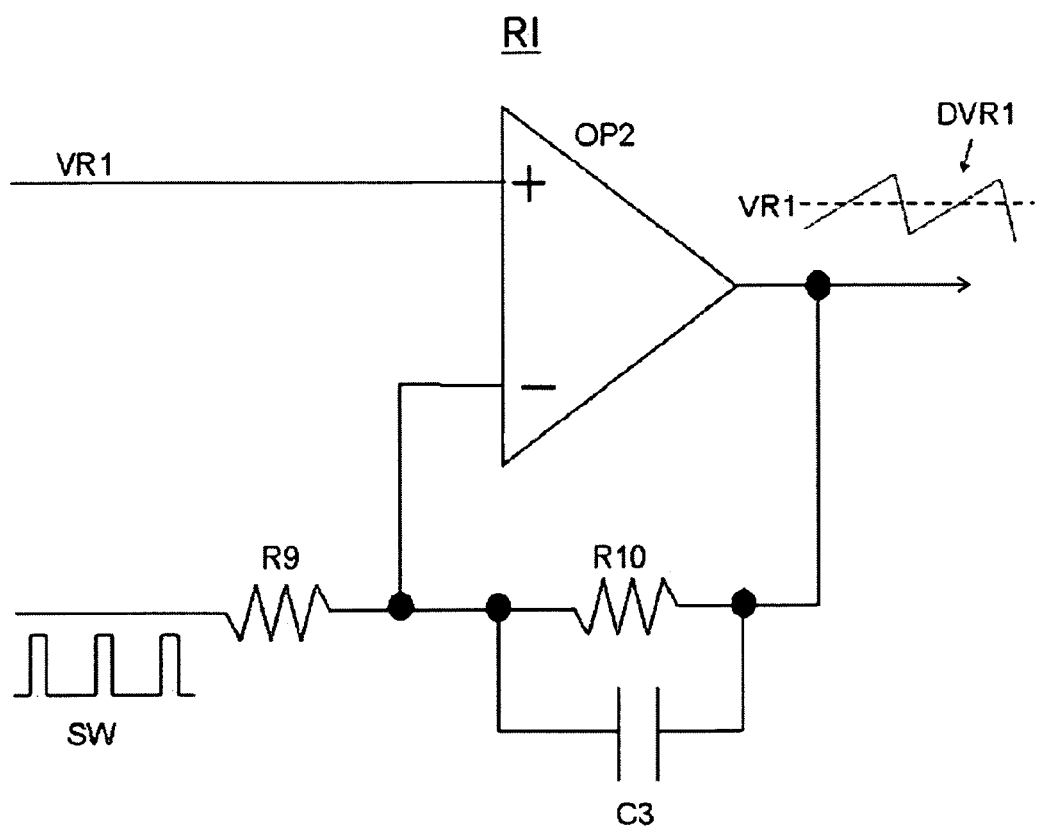
Figure 7:
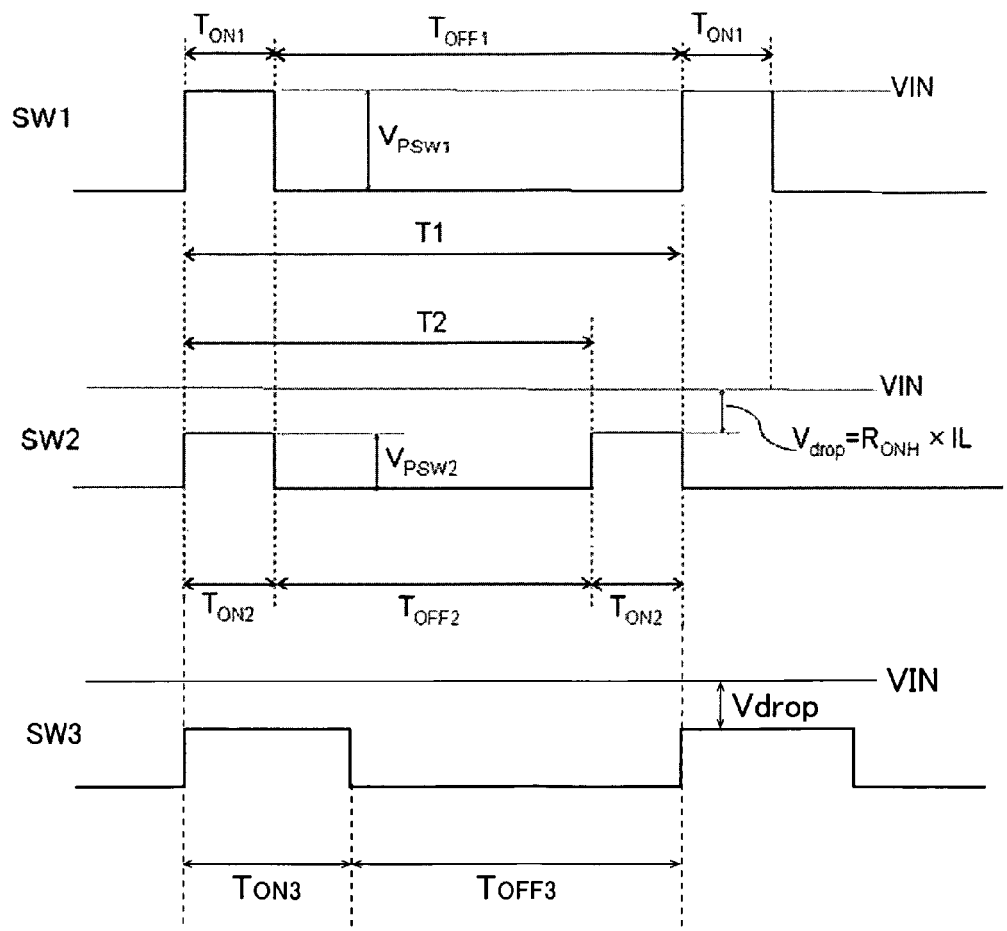
Figure 8:
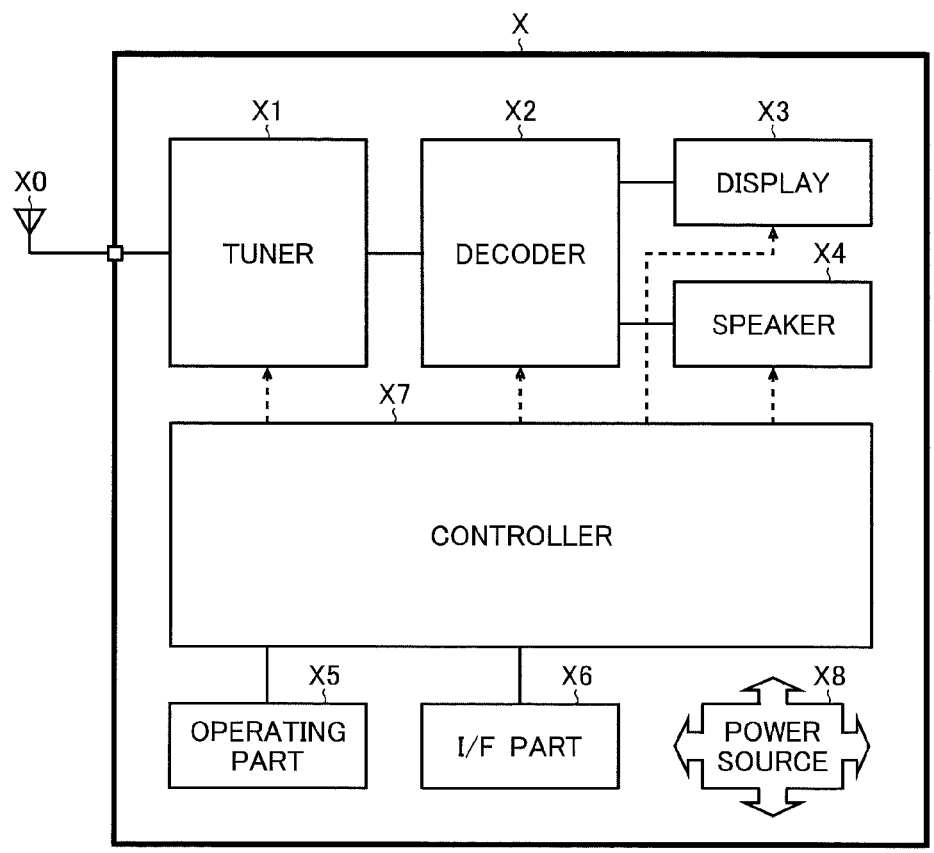
Figure 9A:
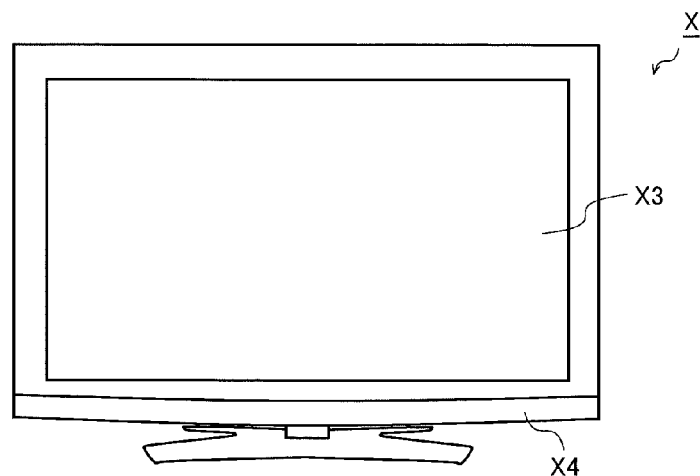
Figure 9B:
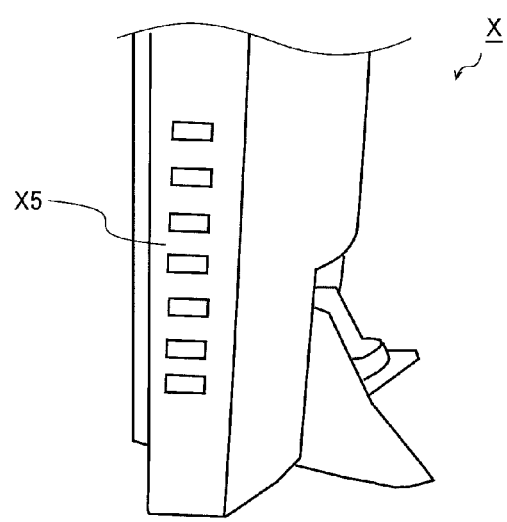

FIG. 1 is a schematic circuit diagram of a DC/DC converter according to a first embodiment of the present invention;

FIG. 2 is a schematic circuit diagram of a DC/DC converter according to a second embodiment of the present invention;

FIG. 3 is an illustration of a synchronous rectifier buck DC/DC converter using fixed ON time control subjected to an experiment conducted in the process of arriving at the first embodiment of the present invention;

FIG. 4 is a schematic illustration of a switching signal output to a switching element of the DC/DC converter shown in FIG. 3;

FIG. 5 is an illustration of a synchronous rectifier buck DC/DC converter using fixed ON time control subjected to an experiment conducted during the process of arriving at the second embodiment of the present invention;

FIG. 6 is an illustration of a ripple generating circuit used in the DC/DC converter of FIG. 5;

FIG. 7 is a timing chart describing the operation of a DC/DC converter 10;

FIG. 8 is a block diagram of an example of one configuration of a television installed with a DC/DC converter;

FIG. 9A is a front view of a television installed with a DC/DC converter;

FIG. 9B is a side view of a television installed with a DC/DC converter; and

Figure 9C:
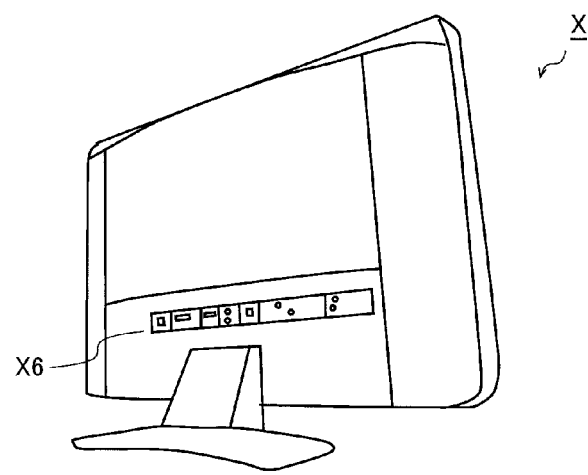

FIG. 9C is a rear view of a television installed with a DC/DC converter;

DETAILED DESCRIPTION OF PREFERRED EMBODIMENTS

First Embodiment

FIG. 1 depicts a DC/DC converter according to a first embodiment of the present invention. A DC/DC converter 10 utilizes the many circuit components shown in FIG. 3; description of the operation of these circuit components shall be omitted. A high-side transistor QH corresponds to the switching element spoken of in the context of the present invention, and a low-side transistor QL functions as a synchronous rectification element.

Briefly put, the first embodiment of the present invention illustrated in FIG. 1 is characterized in having an input voltage VIN, an external terminal T1 that converts the input voltage VIN and outputs an output voltage VOUT, an inductor L1 connected to the external terminal T1, a high-side transistor (switching element) QH having a first primary electrode D connected to the input voltage VIN and a second primary electrode S connected to the inductor L1 so as to supply energy to the inductor L1, an output capacitor C1 that smoothes the energy accumulated in the inductor L1 and from which the output voltage VOUT is output, a feedback voltage generating circuit (feedback voltage VOUT, feedback resistors R4 and R5) that returns the output voltage VOUT generated in the output capacitor C1 to the high-side transistor (switching element) QH, and an adder CB that adds the ON voltage on the high-side transistor (switching element) QH when in an ON state and a feedback voltage VFB1 generated in the feedback voltage generating circuit (output voltage VOUT, feedback resistors R4 and R5).

The ON voltage of the switching element QH when in an ON state is output from a detection transistor QD connected in a row with the switching element QH. This will be described in more detail below.

The first point of difference between the DC/DC converter 10 of FIG. 1 and the DC/DC converter 30 of FIG. 3 is that a detection transistor QD is incorporated in a row with the high-side transistor QH. The first primary electrode D of the high-side transistor QH has a common connection with a first primary electrode D of the detection transistor QD via a detection resistor RD. The second primary electrode S of the high-side transistor QH and a second primary electrode S of the detection transistor QD have a common connection. The common connection point thereof leads to the external terminal T1.

A value is selected for the resistance of the detection resistor RD that is sufficiently high compared to that of an ON resistor RQD of the detection transistor QD when in an ON state; i.e., such that RD≧RQD. This is because such conditions allow a voltage roughly equivalent to the voltage drop generated by the ON resistance of the high-side transistor QH to be output from one terminal of the detection resistor RD. It is not preferable that the detection resistor RD and the ON resistance RQD be roughly equal, as this will allow only about half of the voltage drop generated by the ON resistance of the high-side transistor QH to be output from one terminal of the detection resistor RD.

There is no restriction whatsoever upon the relationship between the physical size of the detection transistor QD and that of the high-side transistor QH. As a result, the physical size of the detection transistor QD can be determined independent of consideration of the high-side transistor QH. In general, however, the smaller the physical size of the detection transistor QD, the greater the ON resistance RQD becomes. The detection resistor RD may be connected to the second primary electrode S of the detection transistor QD rather than the first primary electrode D.

A second point of difference between the present invention shown in FIG. 1 and the device of FIG. 3 is that a level shifter LS has been provided. The level shifter LS is provided so as to shift a detection voltage VQD output from a detection transistor QD away from the input voltage VIN toward the ground potential GND. Because the detection voltage VQD takes the input voltage VIN, which has a comparatively high potential, as a reference, left as-is, combination with the subsequent adder CB is impeded. For this reason, the detection voltage VQD is shifted away from the high potential side toward the low potential side; i.e., toward the ground potential GND. Thus, the level shifter LS is provided for the sake of easily making a direct current combination with the subsequent circuit.

A detection voltage VQD1 shifted from the high potential side toward the low potential side is output at the output of the level shifter LS. The magnitude of the detection voltage VQD1 is expressed by $VQD1 = R_{ONH} \times I_O$, wherein $R_{ONH}$ is the ON resistance of the high-side transistor QH, and $I_O$ is the output current flowing through the high-side transistor QH. The detection voltage VQD1 is added to the feedback voltage VFB1 at the adder CB.

A third point of difference is the provision of the adder CB. The adder CB is provided in order to take the ON voltage of the high-side transistor QH when in an ON state from the detection transistor QD as a detection voltage VQD, and to add this detection voltage VQD (more specifically, the detection voltage VQD1 input via the level shifter LS) to the feedback voltage VFB1 of the output voltage VOUT. The feedback voltage VFB1 is determined by the feedback resistors R4 and R5 and the output voltage VOUT. Thus, the feedback resistors R4 and R5 and output voltage VOUT constitute a feedback voltage generating circuit.

The output voltage VOUT is effectively the output voltage of the DC/DC converter output from the common connection point of the inductor L1 and the output capacitor C1.

As described above, the ON duty ratio $D_{ON}$ of the buck DC/DC converter is uniquely determined by the magnitudes of the input voltage VIN and the output voltage VOUT. However, the ratio obtained in this state ignores the ON resistances of the high-side transistor QH and the low-side transistor QL. However, the heavier the load on the DC/DC converter 10, the less negligible the ON resistance becomes.

The ON resistances of the high-side transistor QH and the low-side transistor QL when in an ON state in FIG. 1 are expressed by numerical formulas 3 and 4, wherein $R_{ONH}$ and $R_{ONL}$ are the ON resistances of the high-side transistor QH and the low-side transistor QL, respectively, $T_{ON}$ is the ON period of the high-side transistor QH, $T_{OFF}$ is the OFF period, and $\Delta I_{ON}$ and $\Delta I_{OFF}$ are the increases in the current flowing through the inductor L1 during each period. In numerical formulas 3 and 4, L represents the inductance of the inductor L1, and $I_O$ represents the magnitude of the output current supplied from the high-side transistor QH or the low-side transistor (synchronous rectifier transistor) QL. The current path from the low-side transistor QL to the inductor L1 is formed during the OFF period $T_{OFF}$ of the high-side transistor QH.

(Numerical Formula 3)

$$\Delta I_{ON} = \int_0^{T_{ON}} \frac{(VIN - I_O \cdot R_{ONH} - VOUT)}{L} dt = \frac{(VIN - I_O \cdot R_{ONH} - VOUT)}{L} \cdot T_{ON} \quad (3)$$

(Numerical Formula 4)

$$\Delta I_{OFF} = \int_0^{T_{OFF}} \frac{(-I_O \cdot R_{ONL} - VOUT)}{L} dt = \frac{-(I_O \cdot R_{ONL} + VOUT)}{L} \cdot T_{OFF} \quad (4)$$

In numerical formulas 3 and 4, when a current flowing through the inductor L1 is connected, the load current flowing through the inductor L1 neither increases nor decreases, so that $\Delta I_{ON} = \Delta I_{OFF}$; thus, the on duty ratio $D_{ON}$ is expressed by numerical formula 5.

(Numerical Formula 5)

$$D_{ON} = \frac{T_{ON}}{T_{ON} + T_{OFF}} = \frac{VOUT + I_O \cdot R_{ONL}}{(VIN + I_O \cdot R_{ONL} - I_O \cdot R_{ONLH})} \quad (5)$$

When the ON resistance $R_{ONH}$ of the high-side transistor QH and the ON resistance $R_{ONL}$ of the low-side transistor QL are equal, the on duty ratio $D_{ON}$ of numerical formula 5 can be expressed by numerical formula 6.

(Numerical Formula 6)

$$D_{ON} = \frac{VOUT + I_O \cdot R_{ONH}}{VIN} \quad (6)$$

As is apparent from formula 6, in the first embodiment of the present invention, the on duty ratio $D_{ON}$ of the high-side transistor QH, that is, the switching element, can be set so as to be inversely proportional to the input voltage VIN, and directly proportional to the sum of the output voltage VOUT and the voltage that is the product of the ON resistance $R_{ONH}$ of the high-side transistor QH and the output current $I_O$. This enables defects such as increases in output current $I_O$ and operating frequency to be eliminated, and prevents reductions in noise resistance properties before they occur.

The variable control of the ON period $T_{ON}$ of the DC/DC converter 10 is amply apparent from the description above; for the sake of deepened understanding, a specific description is given below with reference to FIG. 7.

FIG. 7 is a timing chart describing the operation of the DC/DC converter 10 in more detail, and, like the previous FIG. 4, schematically illustrates variations occurring in the switching signal SW output at the external terminal T1 depending on the severity of the load (magnitude of the load current IL).

In FIG. 7, the topmost switching signal SW1 illustrates behavior under light load, and the middle switching signal SW2 and bottommost switching signal SW3 illustrate behavior under heavy loads. The switching signal SW2 and switching signal SW3 are differentiated by whether or not variable control of the ON period $T_{ON}$ reflecting the load current IL as expressed by the above numerical formula 6 is being performed.

The switching signal SW2 illustrates behavior when variable control of the ON period $T_{ON}$ reflecting the load current IL is not being performed, and the switching signal SW3 illustrates behavior when variable control of the ON period $T_{ON}$ reflecting the load current IL is being performed (i.e., the first embodiment is adopted).

When variable control of the ON period $T_{ON}$ reflecting the load current IL is not performed, variation in the switching period occurs (T1≠T2) due to the severity of the load (magnitude of the load current IL), as can be seen by comparing switching signal SW1 and switching signal SW2.

When variable control of the ON period $T_{ON}$ reflecting the load current IL is performed, the ON period $T_{ON}$ is shorter the lighter the load (the lower the load current IL) is, and the ON period $T_{ON}$ increases ($T_{ON1} < _{ON3}$) the heavier the load (the higher the load current IL) is, as can be seen by comparing switching signal SW1 and switching signal SW3, enabling the switching period (and, by extension, the switching frequency) to be kept constant regardless of load severity (magnitude of load current IL).

In this way, the activity of an ON time setter that sets the ON time $T_{ON}$ according to the magnitude of the load current IL flowing through the load (in the example of FIG. 1, a circuit block constituted by the detection transistor QD, detection resistor RD, level shifter LS, and adder CB) minimizes frequency variation in the switching signal SW, enabling prevention of frequency variation in the pseudo-ripple generated based on the switching signal SW. As a result, it is possible to improve load regulation properties (stability of the output voltage OUT against load variations). This is also advantageous in protecting against the effects of EMI.

While FIG. 1 illustrates a synchronous rectifier buck DC/DC converter, the present invention can also be applied to a so-called diode rectifier-type buck DC/DC converter, where a diode is substituted for the low-side transistor (synchronous rectifier transistor) QL.

Second Embodiment

FIG. 2 illustrates a second embodiment of the present invention. This embodiment shares improvement in noise resistance properties in common with the first embodiment.

An integrated circuit IC2 represents the primary circuit of a DC/DC converter 20. The integrated circuit IC2 can utilize the many circuit components included in the integrated circuit IC5 shown in FIG. 5; description of the operation of these shall be omitted. Here, the points of difference between FIG. 2 and FIG. 5 will be described. A first point of difference is that the integrated circuit IC2 does not include an external terminal T2. It is convenient to leave out the external terminal T2 when constructing the integrated circuit IC2. This is because miniaturization of the package containing the integrated circuit IC2 is thus made possible. When a different circuit component is used in place of the eliminated external terminal T2, the circuit functions built into the integrated circuit IC2 can be increased.

A second point of difference between the second embodiment shown in FIG. 2 and the example shown in FIG. 5 is that feedback resistors R11a and R12a for returning the output voltage VOUT are included in the integrated circuit IC2. The feedback resistors R11a and R12a correspond to the feedback resistors R11 and R12 of the DC/DC converter 50 shown in FIG. 5.

A third point of difference between the second embodiment and the example of FIG. 5 is that the non-inverting input terminal (+) of the comparator CMP2 leads out of the integrated circuit IC2 as an external terminal. The third point of difference is related to the second point of difference. The inclusion of the feedback resistors R11a and R12a in the integrated circuit IC2 makes regulation of the output voltage VOUT from outside the integrated circuit IC2 impossible. In order to eliminate this defect, a configuration is adopted wherein the non-inverting input terminal (+) of the comparator CMP2 is directly led to the external terminal of the integrated circuit IC2, and soft start voltage VREF2 is supplied to the non-inverting input terminal (+) of the comparator CMP2.

A fourth point of difference between the second embodiment and the example of FIG. 5, related to the third point of difference, is that a resistor Rref is connected between the non-inverting input terminal (+) of the comparator CMP2, i.e., the external terminal T3, and the ground potential GND. Combining the resistor Rref with a capacitor C4 connected in a row therewith enables the circuit operating point of the comparator CMP2 to be regulated. Thus, regulation equivalent to that performed on the feedback resistors R11a and R12a is performed on the non-inverting input terminal (+) of the comparator CMP2.

Briefly put, the second embodiment of the present invention illustrated in FIG. 2 is characterized in that it is a DC/DC converter 20 having an input voltage VIN; an output terminal T1 that converts the input voltage VIN and outputs an output voltage VOUT; a switching element QH having a first primary electrode D, a second primary electrode S, and a control electrode G connected between the input voltage VIN and the output terminal T1 that repeatedly switches between ON and OFF states; an inductor L1 connected to one of either a first primary electrode D or a second primary electrode S of the switching element QH; an output capacitor C1 that smoothes the energy accumulated in the inductor L1; a feedback voltage generating circuit constituted by a first feedback resistor R11a and a second feedback resistor R12a for returning an output voltage VOUT to the switching element QH; and an integrated circuit IC2 for driving the switching element; and the first feedback resistor R11a and the second feedback resistor R12a are included in the integrated circuit IC2.

The comparator CMP2 compares the soft start voltage VREF2 input to the non-inverting input terminal (+) and a feedback voltage VFB2; and a one-shot circuit OS1 outputs a one-shot pulse PS1 transitioning from a low level to a high level when the soft start voltage VREF2 is greater than the feedback voltage VFB2, and a one-shot pulse transitioning from a high level to a low level when, conversely, the feedback voltage VFB2 is greater than the soft start voltage VREF2. In the DC/DC converter 20 of FIG. 2, this regulation and control of circuit operation is performed not by regulating the feedback voltage VFB2 connected to the non-inverting input terminal (+) of the comparator CMP2, but rather by regulating the magnitude of the resistor Rref and capacitor C4 connected to the external terminal T3.

<Application to a Television>

FIG. 8 is a block diagram illustrating an example of one configuration of a television installed with a DC/DC converter. FIGS. 9A through 9C are front, side, and rear views of a television installed with a DC/DC converter, respectively. A television X having this example configuration has a tuner X1, a decoder X2, a display X3, a speaker X4, a operating part X5, an interface X6, a controller X7, and a power source X8.

The tuner X1 selects a desired channel broadcast signal from signals received by an antenna X0 externally connected to the television X.

The decoder X2 forms an image signal and an audio signal based on the broadcast signal selected with the tuner X1. The decoder X2 also has the function of generating an image signal and an audio signal based on an external input signal from the interface X6.

The display X3 outputs the image signal generated by the decoder X2 as an image. An LCD panel or the like may be favorably used as the display X3.

The speaker X4 outputs the audio signal generated by the decoder as sound.

The operating part X5 is a human interface that accepts user input. A button, switch, remote controller, or the like may be used for the operating part X5.

The interface X6 is a front end for receiving an external input signal from an external device (optic disc play, HDD, or the like).

The controller X7 performs overall control of the operation of the above parts X1 through X6. A CPU (central processing unit) or the like can be used for the controller X7.

The power source X8 supplies power to the above parts X1 through X7. The previously described DC/DC converter 10 or 20 may be favorably used as the power source X8.

In a first embodiment of the DC/DC converter according to the present invention, noise resistance properties can be improved by using a comparatively simple circuit configuration. In a second embodiment, an external terminal can be eliminated, and a feedback terminal of the output voltage, which is sensitive to the effects of noise, can be eliminated from the external terminal of the integrated circuit, improving noise resistance properties. Thus, the DC/DC converter according to the present invention demonstrates high industrial applicability potential.

A best mode for embodying the present invention has been described above, but it will be obvious to one skilled in the art that the teachings disclosed herein can be subjected to various modifications, and that various embodiments having configurations different from the specific examples given above are possible. Thus, the following claims are intended to encompass all possible modifications of the present invention to the extent that they remain within the spirit and technical scope of the present invention.

LIST OF REFERENCE NUMERALS 10, 20 DC/DC CONVERTER
C1 OUTPUT CAPACITOR
C2, C3, C4 CAPACITOR
CB ADDER
CC1 CONSTANT CURRENT SOURCE
CM1 CURRENT MIRROR CIRCUIT
CMP1, CMP2 COMPARATOR
DRV DRIVER
FF S-R FLIP FLOP

IC1, IC2 INTEGRATED CIRCUIT
L1 INDUCTOR
LS LEVEL SHIFTER
OS1 ONE-SHOT CIRCUIT
Q1, Q2 TRANSISTOR
QD DETECTION TRANSISTOR
QH HIGH-SIDE TRANSISTOR (SWITCHING ELEMENT)
QL LOW-SIDE TRANSISTOR (SYNCHRONOUS RECTIFIER TRANSISTOR)
T1, T2, T3, T4 EXTERNAL TERMINAL
X TELEVISION
X0 ANTENNA
X1 TUNER
X2 DECODER
X3 DISPLAY
X4 SPEAKER
X5 OPERATING PART
X6 INTERFACE
X7 CONTROLLER

What is claimed is:

1. A DC/DC converter comprising:
an input voltage;
an output terminal for converting the input voltage and outputting an output voltage;
an inductor connected to the output terminal;
a switching element having a first primary electrode connected to the input voltage and a second primary electrode connected to the output terminal in order for energy to be supplied to the inductor;
an output capacitor for smoothing the energy accumulated within the inductor, and for outputting the output voltage;
a feedback voltage generating circuit for feeding back to the switching element the output voltage generated in the output capacitor; and
an adder for adding the ON voltage of the switching element when ON and the feedback voltage generated in the feedback voltage generating circuit,
wherein the ON voltage when the switching element is ON is outputted from an ON voltage detection transistor connected in parallel with the switching element.

2. The DC/DC converter according to claim 1, wherein:
the DC/DC converter comprises a first primary electrode, a second primary electrode, and a synchronous rectifier transistor having a control electrode; and
the synchronous rectifier transistor has a first primary electrode connected to the output terminal and a second primary electrode connected to a ground potential, and a drive signal that is ON when the switching element is OFF and OFF when the switching element is ON is inputted to the control electrode of the synchronous rectifier transistor.

3. The DC/DC converter according to claim 1, wherein:
the DC/DC converter has a diode in which a cathode is connected to the output terminal and an anode is connected to a ground potential.

4. The DC/DC converter according to claim 1, wherein:
the ON voltage detection transistor has a conduction type identical to that of the switching element;
the ON voltage detection transistor has a first primary electrode, a second primary electrode, and a control electrode;
the control electrodes of the switching element and the ON voltage detection transistor have a common connection;
the first primary electrodes have a common connection over a resistance sufficiently greater than the ON resistance of the ON voltage detection transistor in an ON state; and
the second primary electrodes of the switching element and the ON voltage detection transistor have a common connection.

5. The DC/DC converter according to claim 1, wherein:
the ON voltage detection transistor has a conduction type identical to that of the switching element;
the ON voltage detection transistor has a first primary electrode, a second primary electrode, and a control electrode;
the control electrodes of the switching element and the ON voltage detection transistor have a common connection;
the second primary electrodes have a common connection over a resistance sufficiently greater than ON resistance of the ON voltage detection transistor in an ON state; and
the first primary electrodes of the switching element and the ON voltage detection transistor have a common connection.

6. The DC/DC converter according to claim 1, wherein:
the on voltage outputted from the ON voltage detection transistor is inputted to an adder circuit via a level shifter, and a feedback voltage generated in the feedback circuit is added in the adder circuit.

7. The DC/DC converter according to claim 1, wherein:
the DC/DC converter uses fixed ON time control in which the ON time of the switching element is fixed.

8. The DC/DC converter according to claim 7, wherein:
the fixed ON time control DC/DC converter comprises a one-shot circuit; and
the one-shot circuit includes:
a current mirror circuit;
a capacitor charged by a constant current supplied by the current mirror circuit; and
switch means for discharging an electrical load accumulated in the capacitor.

9. A DC/DC converter comprising:
an input voltage;
an output terminal for converting the input voltage and outputting an output voltage;
a switching element for performing repeated switching between ON and OFF states, the switching element connected between the input voltage and the output terminal and having a first primary electrode, a second primary electrode, and a control electrode;
an inductor connected to one of either the first primary electrode or the second primary electrode of the switching element;
an output capacitor for smoothing the energy accumulated within the inductor;
a feedback voltage generating circuit made of a first feedback resistor and a second feedback resistor for feeding back the output voltage to the switching element;
an integrated circuit for driving the switching element; and
a slope signal generating circuit for generating a slope signal for soft starting the DC/DC converter,
wherein the first feedback resistor and the second feedback resistor are built into the integrated circuit, and
wherein the slope signal generating circuit is constituted by a constant current circuit, a resistor, and a capacitor; the constant current circuit is built into the integrated circuit; and the resistor and capacitor are provided outside the integrated circuit.

10. The DC/DC converter according to claim 9, wherein:
an end of the constant current circuit is connected to a power source voltage;
the resistor and capacitor are connected in a row between another end of the constant current circuit and a ground potential; and
the DC/DC converter further comprises:
a comparator to an end of which is inputted the slope signal generated at the common connection point of the constant current circuit and the parallel connection point of the resistor and the capacitor, and to another end of which is inputted the feedback voltage divided by the first feedback resistor and the second feedback resistor; and
a one-shot circuit driven by the output of the comparator.

11. The DC/DC converter according to claim 10, wherein:
the DC/DC converter comprises a first primary electrode, a second primary electrode, and a synchronous rectifier transistor having a control electrode; and
the synchronous rectifier transistor has a first primary electrode connected to the output terminal and a second primary electrode connected to the ground potential; and
a drive signal that is ON when the switching element is OFF and OFF when the switching element is ON is inputted to the control electrode of the synchronous rectifier transistor.

12. The DC/DC converter according to claim 10, wherein:
the DC/DC converter has a diode in which a cathode is connected to the output terminal and an anode is connected to the ground potential.

13. A DC/DC converter comprising:
an output voltage generator for switching a switching element ON and OFF with a fixed ON time, whereby an output voltage is generated from an input voltage, and same is supplied to a load; and
an ON time setter for setting the on time according to the magnitude of an output current flowing through the load,
wherein the ON time setter shortens the ON time in correspondence with a lower output current, and lengthens the ON time in correspondence with a higher output current, and
wherein the ON duty of the switching element is inversely proportional to the input voltage, and directly proportional to the sum of the output voltage and the product of the ON resistance of the switching element and the output current.

14. The DC/DC converter according to claim 13, further comprising:
a one-shot circuit for comparing a feedback voltage corresponding to the output voltage and a slope voltage with a predetermined frequency, and generating a one-shot pulse for determining the ON period;
wherein the ON time setter includes an adder for adding to the feedback voltage a detection voltage corresponding to the output current.

15. The DC/DC converter according to claim 14, wherein:
the detection voltage is generated using an ON voltage detection transistor connected in a row with the switching element.

16. A television comprising:
a tuner for selecting a desired channel broadcast signal from a reception signal;
a decoder for converting the broadcast signal selected with the tuner into an image signal and an audio signal;
a display for outputting the image signal as an image;
a speaker for outputting the audio signal as sound;
a operating part for accepting user input;
an interface for accepting an external input signal;
a controller for overall control of the operations of the above parts; and
a power source for supplying power to each of the above parts;
wherein the power source includes a DC/DC converter comprising:
an input voltage;
an output terminal for converting the input voltage and outputting an output voltage;
a switching element for performing repeated switching between ON and OFF states, the switching element connected between the input voltage and the output terminal and having a first primary electrode, a second primary electrode, and a control electrode;
an inductor connected to one of either the first primary electrode or the second primary electrode of the switching element;
an output capacitor for smoothing the energy accumulated within the inductor;
a feedback voltage generating circuit made of a first feedback resistor and a second feedback resistor for feeding back the output voltage to the switching element;
an integrated circuit for driving the switching element; and
a slope signal generating circuit for generating a slope signal for soft starting the DC/DC converter,
wherein the first feedback resistor and the second feedback resistor are built into the integrated circuit, and
wherein the slope signal generating circuit is constituted by a constant current circuit, a resistor, and a capacitor; the constant current circuit is built into the integrated circuit; and the resistor and capacitor are provided outside the integrated circuit.

* * * * *